(12) United States Patent
Yeh

(10) Patent No.: US 8,667,234 B2
(45) Date of Patent: Mar. 4, 2014

(54) DATA WRITING METHOD, MEMORY CONTROLLER, AND MEMORY STORAGE APPARATUS

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 307 days.

(21) Appl. No.: 13/253,981

(22) Filed: Oct. 6, 2011

(65) Prior Publication Data

US 2013/0024604 A1  Jan. 24, 2013

(30) Foreign Application Priority Data

Jul. 21, 2011  (TW) .............................. 100125797 A

(51) Int. Cl.
G06F 13/00   (2006.01)
(52) U.S. Cl.
USPC ............................ 711/156; 711/158; 711/209
(58) Field of Classification Search
USPC ......................................... 711/156, 158, 209
See application file for complete search history.

(56) References Cited

U.S. PATENT DOCUMENTS

2005/0172065 A1* 8/2005 Keays ........................... 711/103

* cited by examiner

Primary Examiner — Reba I Elmore
(74) Attorney, Agent, or Firm — Jianq Chyun IP Office

(57) ABSTRACT

A method for writing updated data into a flash memory module having a plurality of physical pages is provided, wherein each physical page is the smallest writing unit of the flash memory module. The method includes partitioning a physical page into storage segments and configuring a state mark for each storage segment, wherein the state marks indicate the validity of data stored in the storage segments. The method also includes writing the updated data into at least one of the storage segments and changing the state mark corresponding to the storage segment containing the updated data, wherein the state mark corresponding to the storage segment containing the updated data indicates a valid state, and the state marks corresponding to the other storage segments of the physical page not containing the updated data indicate an invalid state. Thereby, the time for writing data into a physical page is effectively shortened.

17 Claims, 11 Drawing Sheets

DATA WRITING METHOD, MEMORY CONTROLLER, AND MEMORY STORAGE APPARATUS

CROSS-REFERENCE TO RELATED APPLICATION

This application claims the priority benefit of Taiwan application serial no. 100125797, filed Jul. 21, 2011. The entirety of the above-mentioned patent application is hereby incorporated by reference herein and made a part of this specification.

BACKGROUND

1. Technology Field

The present invention relates to a data writing method for a rewritable non-volatile memory module, and a memory controller and a memory storage apparatus using the same.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, cell phones, personal digital assistants (PDAs), and notebook computers) due to its many characteristics such as data non-volatility, low power consumption, small volume, non-mechanical structure, and high access speed. For example, a solid state drive (SSD) is a storage apparatus which uses a flash memory as its storage medium. Thus, in recent years, the flash memory industry has become a major part of the electronic industry.

A rewritable non-volatile memory module has a plurality of physical blocks, and each of the physical blocks has a plurality of physical pages. While writing data into a physical block, the data has to be written according to the sequence of the physical pages in the physical block. In addition, a physical page already containing data has to be erased before it is used for writing a new data. Particularly, physical block is the smallest unit for erasing data, and physical page is the smallest unit for programming (i.e., writing) data.

In order to increase the operation efficiency, a memory controller of a memory storage apparatus may group the physical blocks of a rewritable non-volatile memory module into a data area and a spare area.

Physical blocks in the data area are used for storing data written by a host system. To be specific, a memory management circuit converts a logical access address accessed by the host system into a logical page of a logical block and maps the logical page of the logical block to a physical page of a physical block in the data area. Namely, in the management of a flash memory module, the physical blocks in the data area are considered used physical blocks (for example, already containing data written by the host system). In addition, the memory management circuit records the mapping relationship between the logical blocks and the physical blocks in the data area in a logical block-physical block mapping table, wherein the logical pages of a logical block are sequentially mapped to the physical pages of the corresponding physical block.

Physical blocks in the spare area are used for substituting physical blocks in the data area. To be specific, a physical block already containing data has to be erased before it is used for writing new data, and a physical block in the spare area is used for writing updated data to substitute the physical block originally mapped to a logical block. Accordingly, the physical blocks in the spare area are either blank or available blocks (i.e., no data is recorded therein or data recorded therein is marked as invalid data).

Namely, when the storage space of a memory storage apparatus is formatted, physical blocks in the data area are mapped to logical blocks and considered already containing updated data. Subsequently, when a host system is about to store data into a logical page of a logical block, the memory controller selects a blank physical block from the spare area and writes the data into a physical page of the selected physical block, so as to complete the data update in the logical page. However, as described above, physical page is the smallest unit for programming (i.e., writing) data. Thus, when the host system is about to update only a part of the data in a logical page (i.e., the size of data to be written is smaller than a page capacity), the memory controller needs to read old valid data from the physical page originally mapped to the logical page, arranges the updated data and the old valid data to generate a complete valid page data, and then writes the valid page data into the blank physical page.

Along with the development of semiconductor technologies, the page capacity of each physical page in rewritable non-volatile memory modules has been increasing. For example, each physical page in an existing rewritable non-volatile memory module is usually designed to store 8 kilobytes (KB) of user data (i.e., the capacity of each page is 8 KB). However, the operating system (OS) of a host system (for example, a personal computer) usually stores data in a smaller unit. For example, the MS Windows 7 operating system always stores 4 KB of data. Thus, a memory controller needs to read and arrange valid data frequently in order to write data into physical pages, which seriously affects the writing speed of a memory storage apparatus.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing method, a memory controller, and a memory storage apparatus, wherein data can be instantly written into a physical page without arranging valid page data.

According to an exemplary embodiment of the present invention, a data writing method for writing updated data into a rewritable non-volatile memory module is provided. The rewritable non-volatile memory module has a plurality of physical pages. The physical pages are alternatively mapped to a plurality of logical pages. The updated data belongs to a first logical page among the logical pages and is sequentially stored into the first logical page by starting from a logical offset address of the first logical page. The data writing method includes sequentially partitioning a first physical page among the physical pages into a plurality of storage segments and configuring a state mark for each of the storage segments, wherein each of the storage segments has a starting physical offset address, and the state marks are initially recorded to indicate an invalid state. The data writing method also includes determining whether the size of the updated data is smaller than a data access unit, wherein the data access unit is equal to the page capacity of each of the physical pages. The data writing method further includes when the size of the updated data is smaller than the data access unit, further determining whether the logical offset address corresponding to the updated data is corresponding to the starting physical offset address of one of the storage segments in the first physical page and whether the size of the updated data is equal to a segment capacity of the storage segment. The data writing method still includes when the logical offset address corresponding to the updated data is corresponding to the starting physical offset address of the storage segment and the size of the updated data is equal to the segment capacity of the storage segment, writing the updated data into the storage segment and recording the state mark corresponding to the storage segment to indicate a valid state, wherein when the updated data is written into the storage segment, valid data belonging to other logical offset addresses of the first logical page is not written into the other storage segments.

According to an exemplary embodiment of the present invention, a data writing method for writing updated data to be stored in a logical page into a physical page of a rewritable non-volatile memory module, wherein the updated data is stored into the logical page by starting from a logical offset address of the logical page. The data writing method includes sequentially partitioning the physical page into a first storage segment and a second storage segment, wherein the first storage segment has a first starting physical offset address, the second storage segment has a second starting physical offset address, and the first storage segment and the second storage segment have the same segment capacity. The data writing method also includes respectively configuring a first state mark and a second state mark for the first storage segment and the second storage segment, wherein the first state mark and the second state mark are initially recorded to indicate an invalid state. The data writing method further includes determining whether the size of the updated data is smaller than a data access unit, wherein the data access unit is equal to a page capacity of the physical page. The data writing method still includes when the size of the updated data is smaller than the data access unit, further determining whether the logical offset address corresponding to the updated data is corresponding to the first starting physical offset address or the second starting physical offset address. The data writing method further includes when the logical offset address corresponding to the updated data is corresponding to the first starting physical offset address, further determining whether the size of the updated data is equal to the segment capacity. The data writing method further includes when the size of the updated data is equal to the segment capacity, writing the updated data into the first storage segment and recording the first state mark to indicate a valid state, wherein when the updated data is written into the first storage segment, valid data belonging to other logical offset addresses of the logical page is not written into the second storage segment.

According to an exemplary embodiment of the present invention, a memory controller for controlling a rewritable non-volatile memory module is provided. The memory controller includes a host interface, a memory interface, a microcontroller, a memory management unit, a data processing unit, and a memory writing unit. The host interface is configured to couple to a host system. The memory interface is configured to couple to the rewritable non-volatile memory module, wherein the rewritable non-volatile memory module has a plurality of physical pages. The microcontroller is coupled to the host interface and the memory interface. The memory management unit, the data processing unit, and the memory writing unit are coupled to the microcontroller. The memory management unit configures a plurality of logical pages and alternatively maps the physical pages to the logical pages. The host interface receives updated data from the host system, wherein the updated data belongs to a first logical page among the logical pages and is sequentially stored into the first logical page by starting from a logical offset address of the first logical page. The memory management unit sequentially partitions a first physical page among the physical pages into a plurality of storage segments and configures a state mark for each of the storage segments, wherein each of the storage segments has a starting physical offset address, and the state marks are initially recorded to indicate an invalid state. The data processing unit determines whether the size of the updated data is smaller than a data access unit, wherein the data access unit is equal to the page capacity of each physical page. When the size of the updated data is smaller than the data access unit, the data processing unit further determines whether the logical offset address corresponding to the updated data is corresponding to the starting physical offset address of one of the storage segments and whether the size of the updated data is equal to a segment capacity of the storage segment. When the logical offset address corresponding to the updated data is corresponding to the starting physical offset address of the storage segment and the size of the updated data is equal to the segment capacity of the storage segment, the memory writing unit writes the updated data into the storage segment and records the state mark corresponding to the storage segment to indicate a valid state, wherein when the updated data is written into the storage segment, valid data belonging to other logical offset addresses of the first logical page is not written into the other storage segments.

According to an exemplary embodiment of the present invention, a memory storage apparatus including a connector, a rewritable non-volatile memory module, and a memory controller is provided. The connector is configured to couple to a host system. The rewritable non-volatile memory module has a plurality of physical pages. The memory controller is coupled to the rewritable non-volatile memory module and the connector. The memory controller configures a plurality of logical pages and alternatively maps the physical pages to the logical pages. The connector receives updated data from the host system, wherein the updated data belongs to a first logical page among the logical pages and is sequentially stored into the first logical page by starting from a logical offset address of the first logical page. The memory controller sequentially partitions a first physical page among the physical pages into a plurality of storage segments and configures a state mark for each of the storage segments, wherein each of the storage segments has a starting physical offset address, and the state marks are initially recorded to indicate an invalid state. The memory controller determines whether the size of the updated data is smaller than a data access unit, wherein the data access unit is equal to the page capacity of each physical page. When the size of the updated data is smaller than the data access unit, the memory controller further determines whether the logical offset address corresponding to the updated data is corresponding to the starting physical offset address of one of the storage segments and whether the size of the updated data is equal to a segment capacity of the storage segment. When the logical offset address corresponding to the updated data is corresponding to the starting physical offset address of the storage segment and the size of the updated data is equal to the segment capacity of the storage segment, the memory controller writes the updated data into the storage segment and records the state mark corresponding to the storage segment to indicate a valid state, wherein when the updated data is written into the storage segment, valid data belonging to other logical offset addresses of the first logical page is not written into the other storage segments.

According to an exemplary embodiment of the present invention, a data writing method for writing updated data into a flash memory module is provided. The flash memory module has a plurality of physical pages. The physical pages are alternatively mapped to a plurality of logical pages. The updated data belongs to a first logical page among the logical pages, wherein each of the physical pages is a smallest writing unit of the flash memory module. The data writing method includes partitioning a first physical page among the physical pages into a plurality of storage segments and configuring a state mark for each of the storage segments to indicate validity of data stored in the storage segment. The data writing method also includes writing the updated data into at least one of the storage segments and changing the state mark corresponding to the storage segment containing the updated data, wherein the state mark corresponding to the storage segment containing the updated data in the first physical page indicates a valid state, and the state marks corresponding to the other storage segments not containing the updated data indicate an invalid data.

As described above, the data writing method, the memory controller, and the memory storage apparatus in exemplary embodiments of the invention can effectively shorten the time for writing data.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
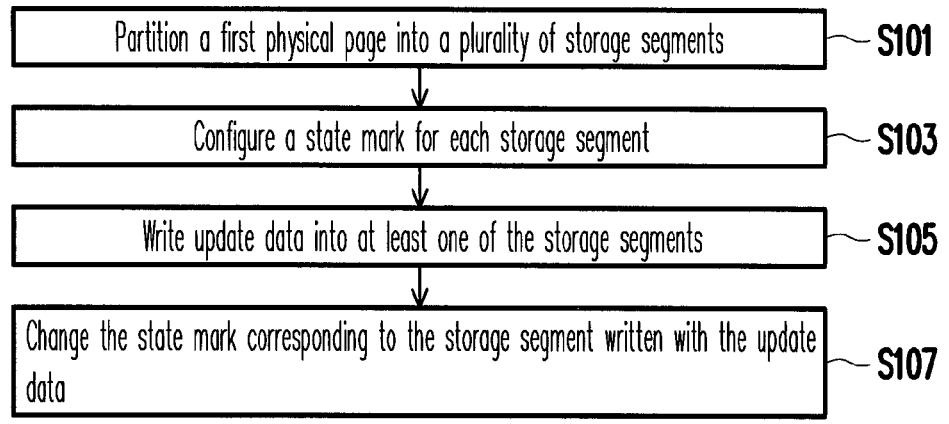
FIG. 1 is a general flowchart of a data writing method provided by the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In the invention, each physical page is partitioned into a plurality of storage segments, and while writing data, the updated data is only written into the updated storage segment, and no data is written into those un-updated storage segments. Referring to FIG. 1, to be specific, when updated data is to be written into a physical page (referred to as a first physical page thereinafter) of a rewritable non-volatile memory module (for example, a flash memory module), the first physical page is partitioned into a plurality of storage segments (S101), and a state mark is configured for each storage segment (S103), wherein the state marks respectively indicate the validity of data stored in the storage segments. After that, the updated data is written into at least one of the storage segments (S105), and the state mark corresponding to the storage segment written with the updated data is changed (S107), wherein the state mark corresponding to the storage segment containing the updated data indicates a valid state, and the state marks corresponding to the other storage segments that do not contain the updated data indicate an invalid state. Thereby, since un-updated data is to be filled into the other storage segments, the time for writing data is greatly shortened. Below, several exemplary embodiments of the invention will be described with reference to accompanying drawings.

Figure 2A:
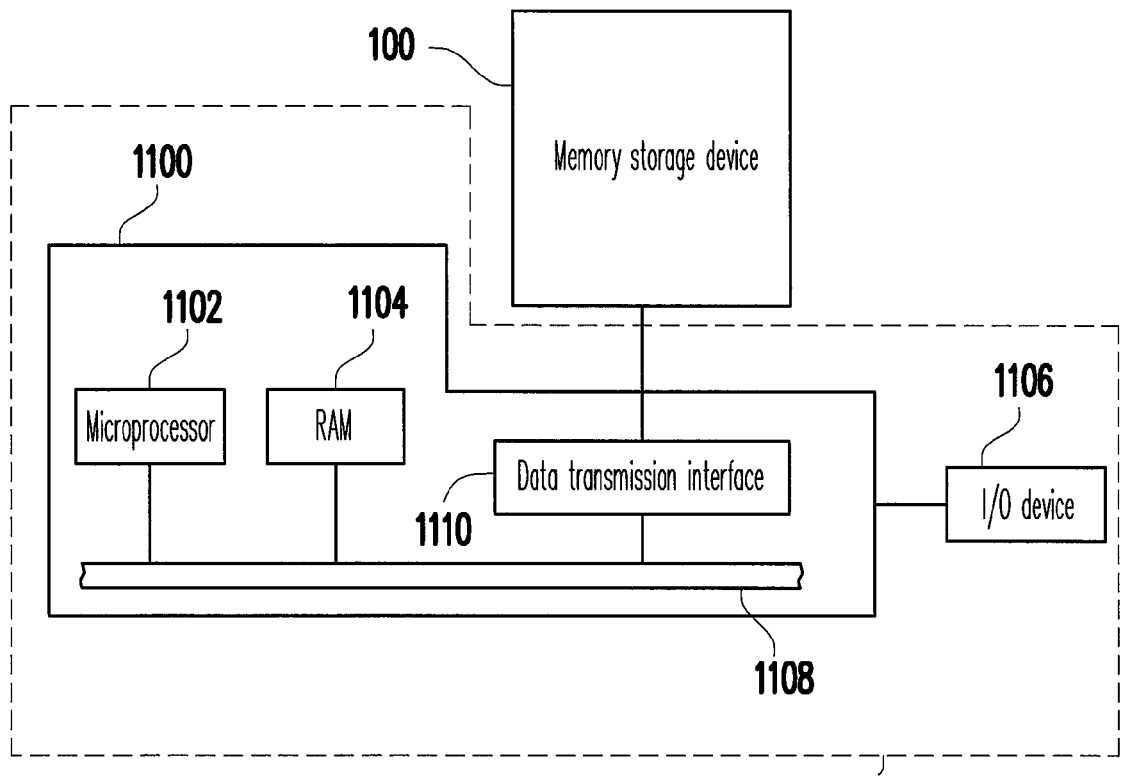
FIG. 2A illustrates a host system and a memory storage apparatus according to an exemplary embodiment of the present invention.

FIG. 2A illustrates a host system and a memory storage apparatus according to an exemplary embodiment of the present invention.

Figure 2B:
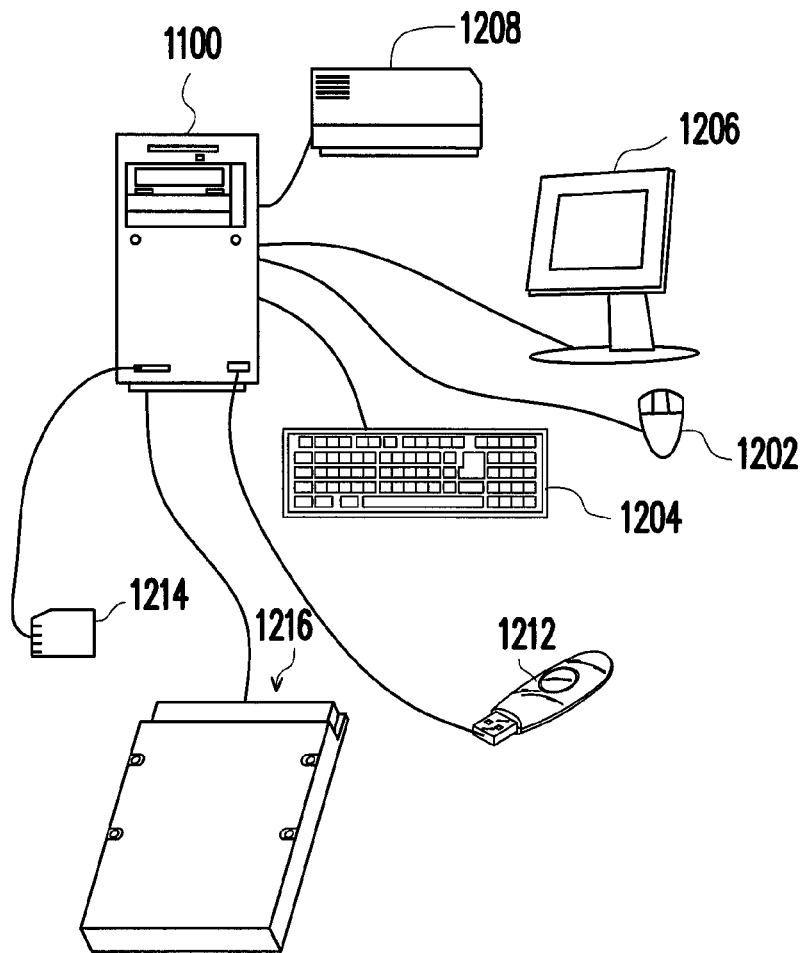
FIG. 2B is a diagram of a computer, an input/output (I/O) device, and a memory storage apparatus according to an exemplary embodiment of the present invention.

Referring to FIG. 2A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2B. It should be understood that the I/O device 1106 is not limited to the devices illustrated in FIG. 2B and may further include other devices.

In the present embodiment, a memory storage apparatus 100 is coupled to other components of the host system 1000 through the data transmission interface 1110. Data can be written into or read from the memory storage apparatus 100 through the operations of the microprocessor 1102, the RAM 1104, and the I/O device 1106. The memory storage apparatus 100 may be a rewritable non-volatile memory storage apparatus, such as the flash drive 1212, the memory card 1214, or the solid state drive (SSD) 1216 illustrated in FIG. 2B.

Figure 2C:
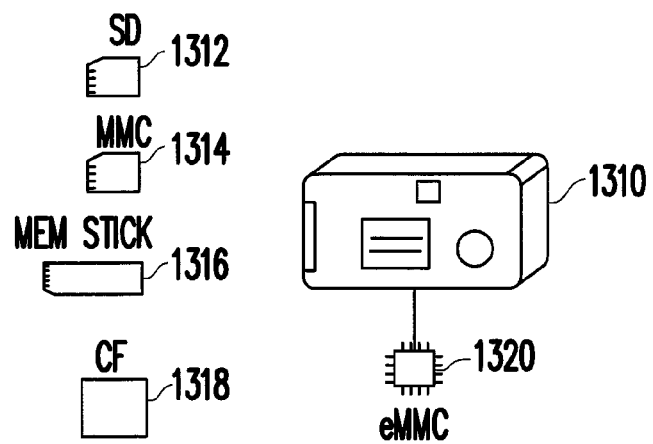
FIG. 2C is a diagram of a host system and a memory storage apparatus according to another exemplary embodiment of the present invention.

Generally, the host system 1000 may be substantially any system which can work with the memory storage apparatus 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage apparatus is then a secure digital (SD) card 1312, a multi media card (MMC) card 1314, a memory stick (MS) 1316, a compact flash (CF) card 1318, or an embedded storage device 1320 (as shown in FIG. 2C) used by the digital camera (video camera) 1310. The embedded storage device 1320 includes an embedded MMC (eMMC). It should be mentioned that an eMMC is directly coupled to the motherboard of a host system.

Figure 3:
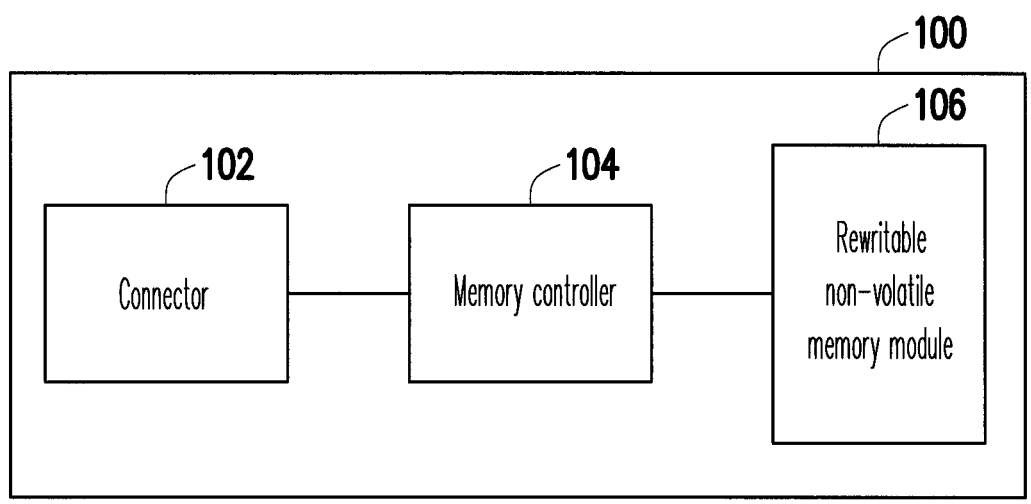
FIG. 3 is a schematic block diagram of a memory storage apparatus according to an exemplary embodiment of the present invention.

FIG. 3 is a schematic block diagram of a memory storage apparatus according to an exemplary embodiment of the present invention.

Referring to FIG. 3, the memory storage apparatus 100 includes a connector 102, a memory controller 104, and a rewritable non-volatile memory module 106.

In the present exemplary embodiment, the connector 102 complies with the serial advanced technology attachment (SATA) standard. However, the invention is not limited thereto, and the connector 102 may also comply with the Institute of Electrical and Electronic Engineers (IEEE) 1394 standard, the peripheral component interconnect (PCI) express standard, the parallel advanced technology attachment (PATA) standard, the universal serial bus (USB) standard, the SD interface standard, the MS interface standard, the MMC interface standard, the CF interface standard, the integrated device electronics (IDE) standard or any other suitable standard.

The memory controller 104 executes a plurality of logic gates or control instructions implemented in a hardware form or a firmware form and performs various data operations on the rewritable non-volatile memory module 106 according to commands issued by the host system 1000.

The rewritable non-volatile memory module 106 is coupled to the memory controller 104 and has a plurality of physical blocks for storing data written by the host system 1000. In the present exemplary embodiment, each of the physical blocks has a plurality of physical pages, wherein the physical pages belonging to the same physical block can be individually written but have to be erased all together. Each physical block may be composed of 128 physical pages, and the capacity of each physical page is 8 kilobytes (KB). However, the present invention is not limited thereto, and each physical block may also be composed of 64, 256, or any other number of physical pages.

To be specific, physical block is the smallest unit for erasing data. Namely, each physical block contains the least number of memory cells that are erased together. Physical page is the smallest unit for programming data. Namely, physical page is the smallest unit for writing data. To be specific, after the memory controller 104 gives a write command to the rewritable non-volatile memory module 106, the rewritable non-volatile memory module 106 receives data belonging to one physical page from the memory controller 104 and temporarily stores the data into a buffer memory (not shown) thereof. Subsequently, the data is programmed into one physical page all together.

Each physical page usually includes a data bit area and a redundant bit area. The data bit area is used for storing user data, and the redundant bit area is used for storing system data (for example, error checking and correcting (ECC) codes). Herein the data bit area has a page capacity and is also referred to as a data access unit.

In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, any other flash memory module, or any other memory module having the same characteristics.

Figure 4:
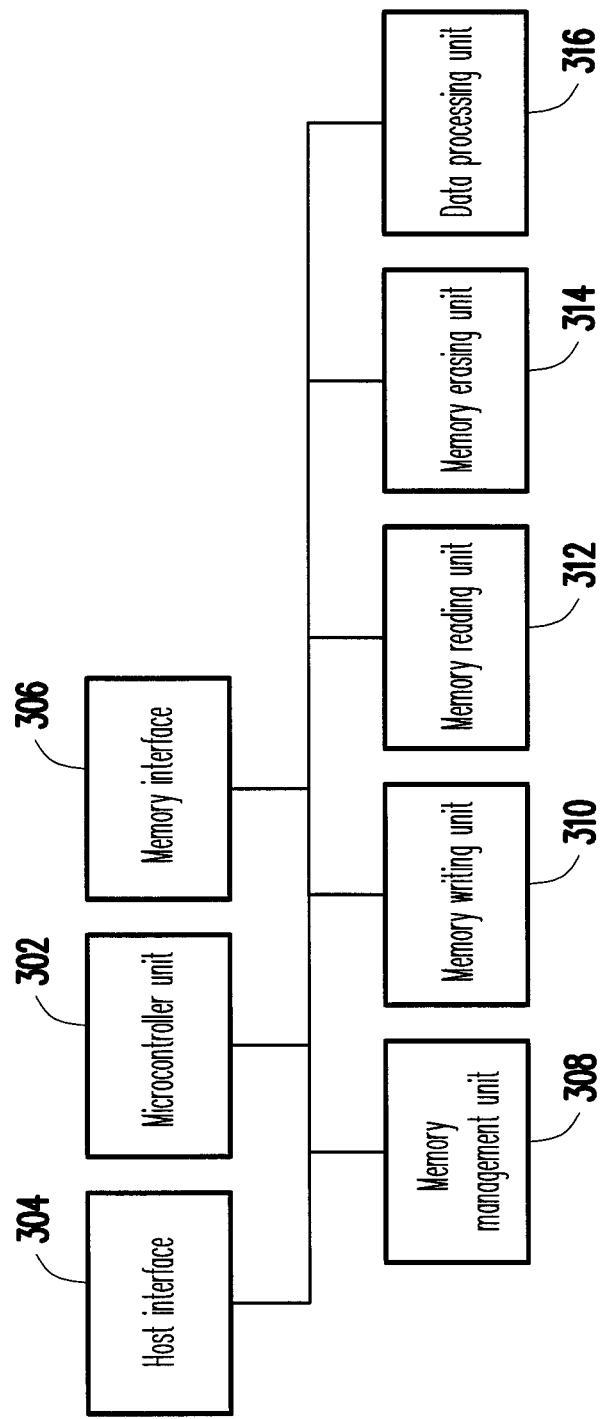
FIG. 4 is a schematic block diagram of a memory controller according to an exemplary embodiment of the present invention.

FIG. 4 is a schematic block diagram of a memory controller according to an exemplary embodiment of the present invention.

Referring to FIG. 4, the memory controller 104 includes a microcontroller unit 302, a host interface 304, a memory interface 306, a memory management unit 308, a memory writing unit 310, a memory reading unit 312, a memory erasing unit 314, and a data processing unit 316.

The microcontroller unit 302 controls the overall operation of the memory controller 104.

The host interface 304 is coupled to the microcontroller unit 302 and configured to receive and identify commands and data issued by the host system 1000. In the present exemplary embodiment, the host interface 304 complies with the SATA standard. However, the present invention is not limited thereto, and the host interface 304 may also comply with the PATA standard, the IEEE 1394 standard, the PCI express standard, the USB standard, the SD standard, the MS standard, the MMC standard, the CF standard, the IDE standard, or any other suitable data transmission standard.

The memory interface 306 is coupled to the microcontroller unit 302 and configured to access the rewritable non-volatile memory module 106. Namely, data to be written into the rewritable non-volatile memory module 106 is converted by the memory interface 306 into a format acceptable to the rewritable non-volatile memory module 106.

The memory management unit 308, the memory writing unit 310, the memory reading unit 312, the memory erasing unit 314, and the data processing unit 316 are coupled to the microcontroller unit 302. The memory management unit 308 manages the physical blocks of the rewritable non-volatile memory module 106. The memory writing unit 310 gives write commands to the rewritable non-volatile memory module 106 for writing data into the rewritable non-volatile memory module 106. The memory reading unit 312 gives read commands to the rewritable non-volatile memory module 106 for reading data from the rewritable non-volatile memory module 106. The memory erasing unit 314 gives erase commands to the rewritable non-volatile memory module 106 for erasing data from the rewritable non-volatile memory module 106. The data processing unit 316 processes data to be written into or read from the rewritable non-volatile memory module 106.

Figure 5A:
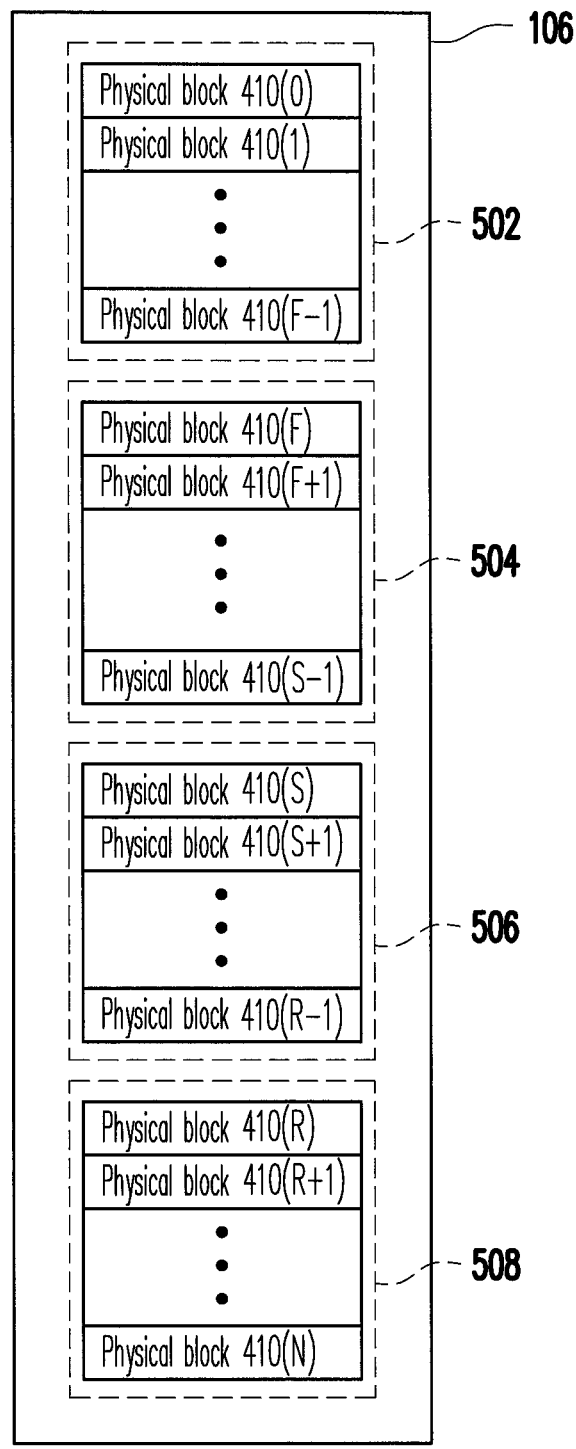
FIG. 5A and FIG. 5B are diagrams of managing physical blocks of a rewritable non-volatile memory module according to an exemplary embodiment of the present invention.
Figure 5B:
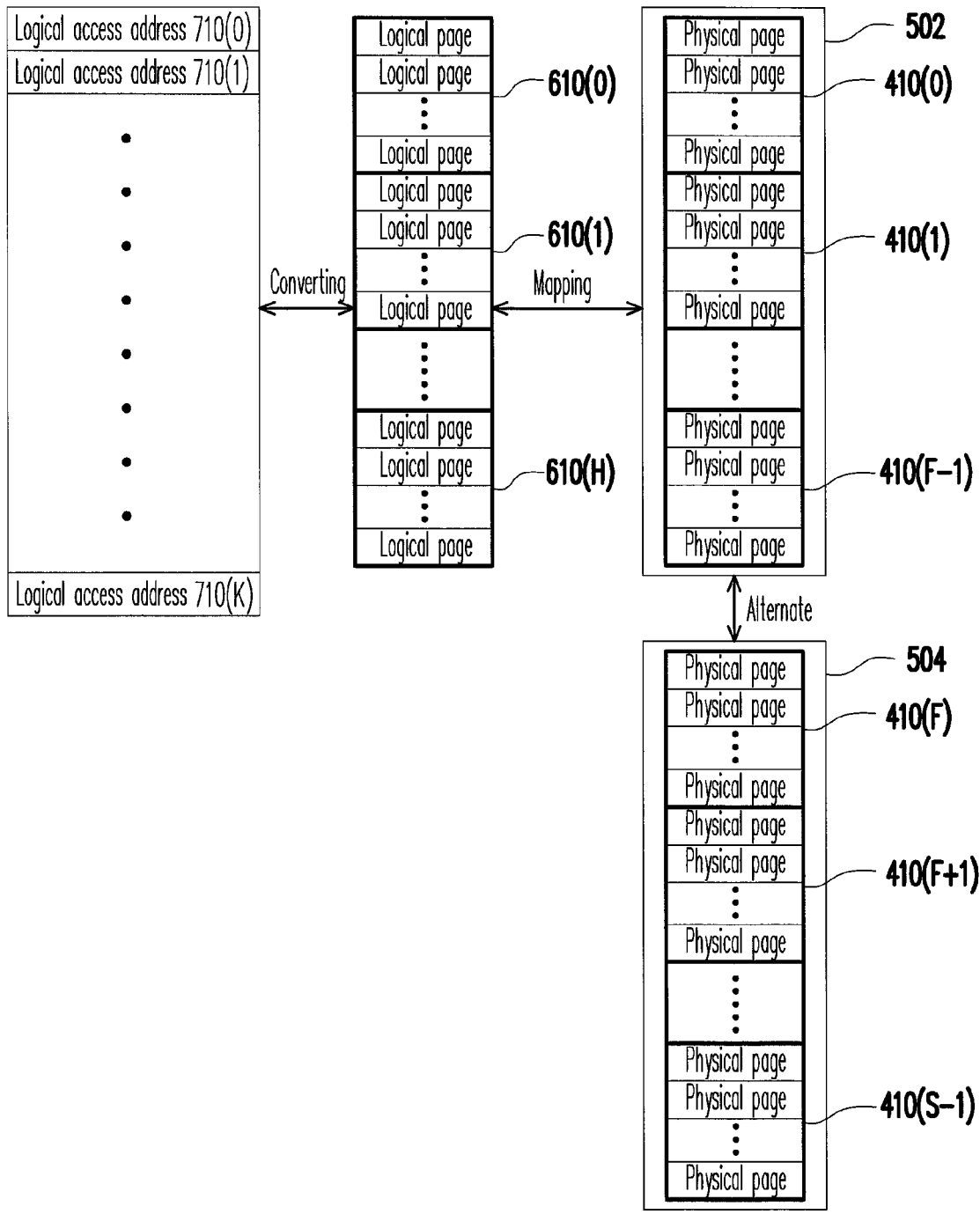

FIG. 5A and FIG. 5B are diagrams of managing physical blocks of a rewritable non-volatile memory module according to an exemplary embodiment of the present invention.

Referring to FIG. 5A, the rewritable non-volatile memory module 106 has physical blocks 410(0)-410(N), and the memory management unit 308 of the memory controller 104 logically groups the physical blocks 410(0)-410(N) into a data area 502, a spare area 504, a system area 506, and a replacement area 508.

Physical blocks logically belonging to the data area 502 and the spare area 504 are used for storing data from the host system 1000. To be specific, physical blocks (also referred to as data physical blocks) in the data area 502 are considered physical blocks already containing data, and physical blocks (also referred to as free physical blocks) in the spare area 504 are physical blocks used for writing new data. For example, when a write command and data to be written are received from the host system 1000, the memory management unit 308 selects a physical block from the spare area 504, the data processing unit 316 arranges the data to be written, and the memory writing unit 310 writes the data into the selected physical block. In addition, when a data merging procedure is to be executed on a logical block, the memory management unit 308 selects a physical block from the spare area 504 as a new data physical block corresponding to the logical block. The memory reading unit 312 reads valid data belonging to the logical block from the rewritable non-volatile memory module 106. The data processing unit 316 arranges the valid data. The memory writing unit 310 writes the arranged valid data into the new data physical block. The memory management unit 308 re-maps the logical block to the new data physical block. In particular, after the data merging procedure is completed, the memory management unit 308 re-associates (or recycles) the data physical block containing invalid data with the spare area 504 for writing new data later on. The memory erasing unit 314 may execute an erasing operation on a physical block when the physical block is associated with the spare area 504 or when the physical block is selected from the spare area 504, so that it is ensured that every physical block selected from the spare area 504 is a blank physical block therefore can be used for writing data.

Physical blocks logically belonging to the system area 506 are used for recording system data. Herein the system data includes the manufacturer and model of the rewritable non-volatile memory module, the number of physical blocks in the rewritable non-volatile memory module, and the number of physical pages in each physical block, etc.

Physical blocks logically belonging to the replacement area 508 are used in a bad block replacement procedure for replacing damaged physical blocks. To be specific, if there are still normal physical blocks in the replacement area 508 and a physical block in the data area 502 is damaged, the memory management unit 308 selects a normal physical block from the replacement area 508 to replace the damaged physical block.

During the operation of the memory storage apparatus 100, the physical blocks associated with the data area 502, the spare area 504, the system area 506, and the replacement area 508 are dynamically changed. For example, those physical blocks alternatively used for storing data are associated with the data area 502 and the spare area 504 dynamically.

It should be mentioned that in the present exemplary embodiment, the memory management unit 308 manages the rewritable non-volatile memory module 106 in units of each physical block. However, present the invention is not limited thereto, and in another exemplary embodiment, the memory management unit 308 may also group the physical blocks into a plurality of physical units and manage the rewritable non-volatile memory module 106 in units of each physical unit. Each physical unit may be composed of at least one physical block from the same memory die or different memory dies.

Referring to FIG. 5B, the memory management unit 308 configures logical blocks 610(0)-610(H) to map the physical blocks in the data area 502, wherein each of the logical blocks has a plurality of logical pages, and the logical pages are sequentially mapped to the physical pages in the corresponding data physical block. When the memory storage apparatus 100 is formatted, the logical blocks 610(0)-610(H) may be initially mapped to the physical blocks 410(0)-410(F−1) in the data area 502.

In the present exemplary embodiment, the memory management unit 308 maintains a logical block-physical block mapping table to record the mapping relationship between the logical blocks 610(0)-610(H) and the physical blocks in the data area 502. In addition, the host system 1000 accesses data in units of each logical access address. A logical access address may be a logical sector. When the host system 1000 accesses data, the memory management unit 308 converts the logical access addresses 710(0)-710(K) corresponding to the memory storage apparatus 100 into addresses in corresponding logical pages. For example, when the host system 1000 is about to access a logical access address, the memory management unit 308 converts the logical access address accessed by the host system 1000 into a multi-dimensional address composed of corresponding logical block, logical page, and logical offset and accesses data in the corresponding physical page according to the logical block-physical block mapping table. Herein an offset is used for defining a logical (or physical) address in a logical page (or a physical page), and which is defined as the distance between the logical (or physical) address and the starting address of the logical page (or physical pages), wherein the logical (or physical) address is also referred to as a logical (or physical) offset address.

Figure 6:
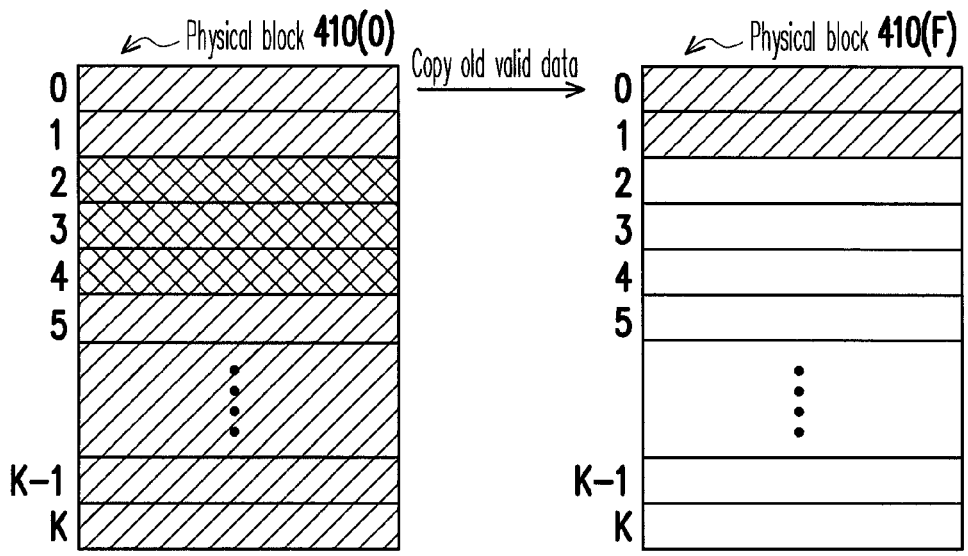
FIGS. 6-8 illustrate an example of writing an updated data by using a child physical block according to an exemplary embodiment of the present invention.
Figure 7:
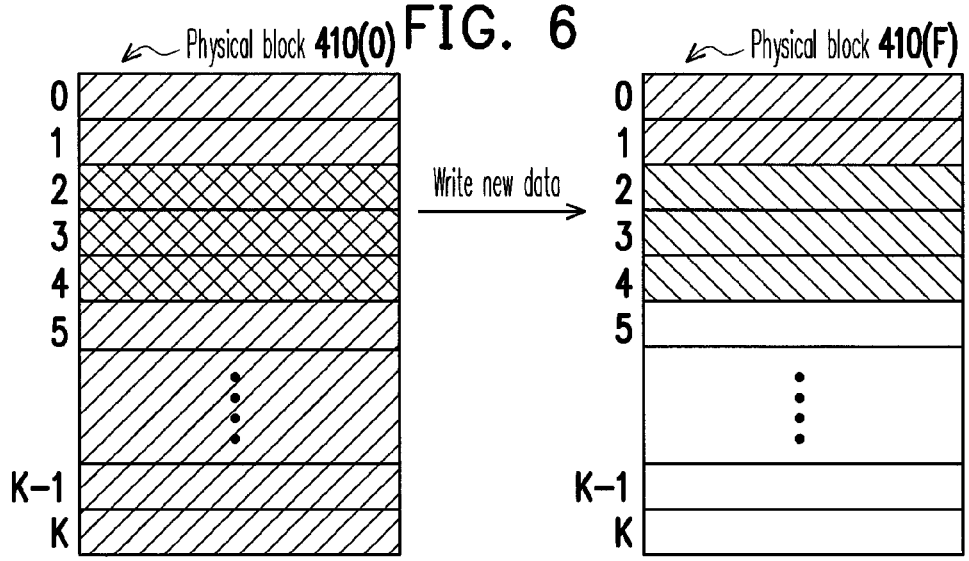
Figure 8:
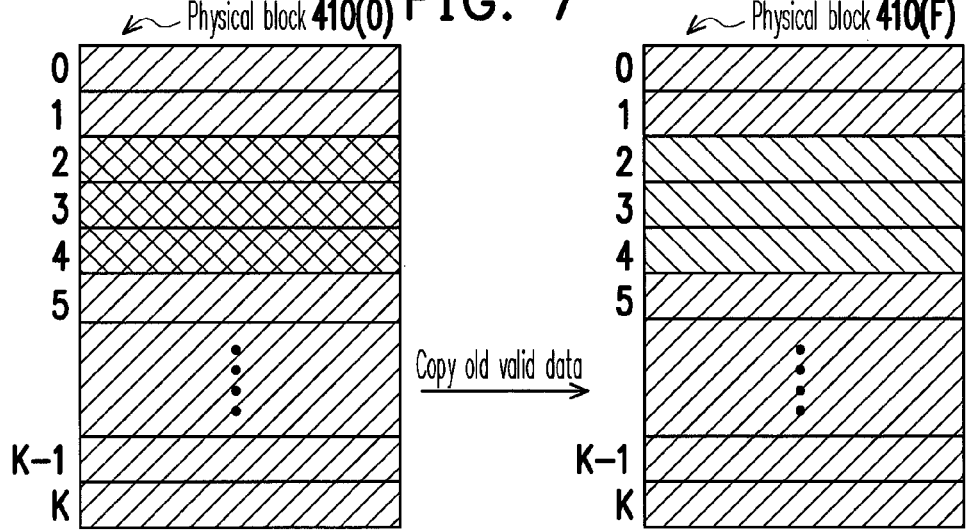

FIGS. 6-8 illustrate an example of writing an updated data by using a child physical block according to an exemplary embodiment of the present invention.

Referring to FIGS. 6-8, assuming that the logical block 610(0) is mapped to the physical block 410(0), when the memory controller 104 receives a write command from the host system 1000 and accordingly is about to write data into a logical page of the logical block 610(0), the memory controller 104 identifies that the logical block 610(0) is currently mapped to the physical block 410(0) according to the logical block-physical block mapping table and selects a physical block 410(F) from the spare area 504 to substitute the physical block 410(0). However, in a writing operation for executing this write command, the memory controller 104 does not move all the valid data in the physical block 410(0) to the physical block 410(F) or erase the physical block 410(0) instantly. To be specific, the memory reading unit 312 reads valid data before the physical page for writing the new data (i.e., data in the $0^{th}$ physical page and the $1^{st}$ physical page of the physical block 410(0)) from the physical block 410(0). After that, the memory writing unit 310 writes the valid data before the physical page for writing the new data in the physical block 410(0) into the $0^{th}$ physical page and the $1^{st}$ physical page of the physical block 410(F) (as shown in FIG. 6) and writes the new data into the $2^{nd}$ to the $4^{th}$ physical pages of the physical block 410(F) (as shown in FIG. 7). By now the memory controller 104 completes the data writing operation. Because the valid data in the physical block 410(0) may become invalid during a next operation (for example, a write command), instantly moving all the valid data in the physical block 410(0) to the physical block 410(F) may become meaningless. In addition, because data has to be sequentially written into the physical pages of a physical block, the memory writing unit 310, the memory reading unit 312, and the data processing unit 316 first move only valid data before the physical page for writing the new data (i.e., data stored in the $0^{th}$ physical page and the $1^{st}$ physical page of the physical block 410(0)) but not the other valid data (i.e., data stored in the $5^{th}$ to the $K^{th}$ physical pages of the physical block 410(0)).

In the present exemplary embodiment, an operation for maintaining such a temporary relationship is referred to as opening mother-child blocks, wherein the original physical block (for example, the physical block 410(0)) is referred to as a mother physical block, while the physical block for substituting the mother physical block (for example, the physical block 410(F)) is referred to as a child physical block.

Subsequently, the memory controller 104 merges data in the physical block 410(0) and the physical block 410(F) into a single physical block when the data in the physical block 410(0) and the physical block 410(F) needs to be merged, so that the efficiency in using these physical blocks may be improved. Herein the operation for merging the mother-child blocks is referred to as a data merging procedure or closing mother-child blocks. For example, as shown in FIG. 8, while closing the mother-child blocks, the memory reading unit 312 reads the remaining valid data from the physical block 410(0) (i.e., data in the $5^{th}$ to the $K^{th}$ physical pages of the physical block 410(0)). After that, the memory writing unit 310 writes the remaining valid data in the physical block 410(0) into the $5^{th}$ to the $K^{th}$ physical pages of the physical block 410(F). Then, the memory erasing unit 314 performs an erasing operation on the physical block 410(0), and the memory management unit 308 associates the erased physical block 410(0) to the spare area 504 and associates the physical block 410(F) with the data area 502. Namely, the memory management unit 308 re-maps the logical block 610(0) to the physical block 410(F) in the logical block-physical block mapping table. Additionally, in the present exemplary embodiment, the memory management unit 308 establishes a spare area physical block table (not shown) to record the physical blocks that are currently associated to the spare area 504. It should be mentioned that there is a limited number of physical blocks in the spare area 504. Accordingly, during the operation of the memory storage apparatus 100, only a limited number of mother-child block sets can be opened. Thus, when the memory storage apparatus 100 receives a write command from the host system 1000, if the number of opened mother-child block sets has reached its upper limit, the memory controller 104 needs to close at least one set of currently opened mother-child blocks before the write command is executed.

It should be mentioned that as described above, when the rewritable non-volatile memory module 106 is programmed, data is written into a physical page in a data access unit. If the size of updated data belonging to a logical page is smaller than the data access unit, other valid data belonging to the logical page has to be read from other physical pages and written into a physical page along with the updated data.

Figure 9:
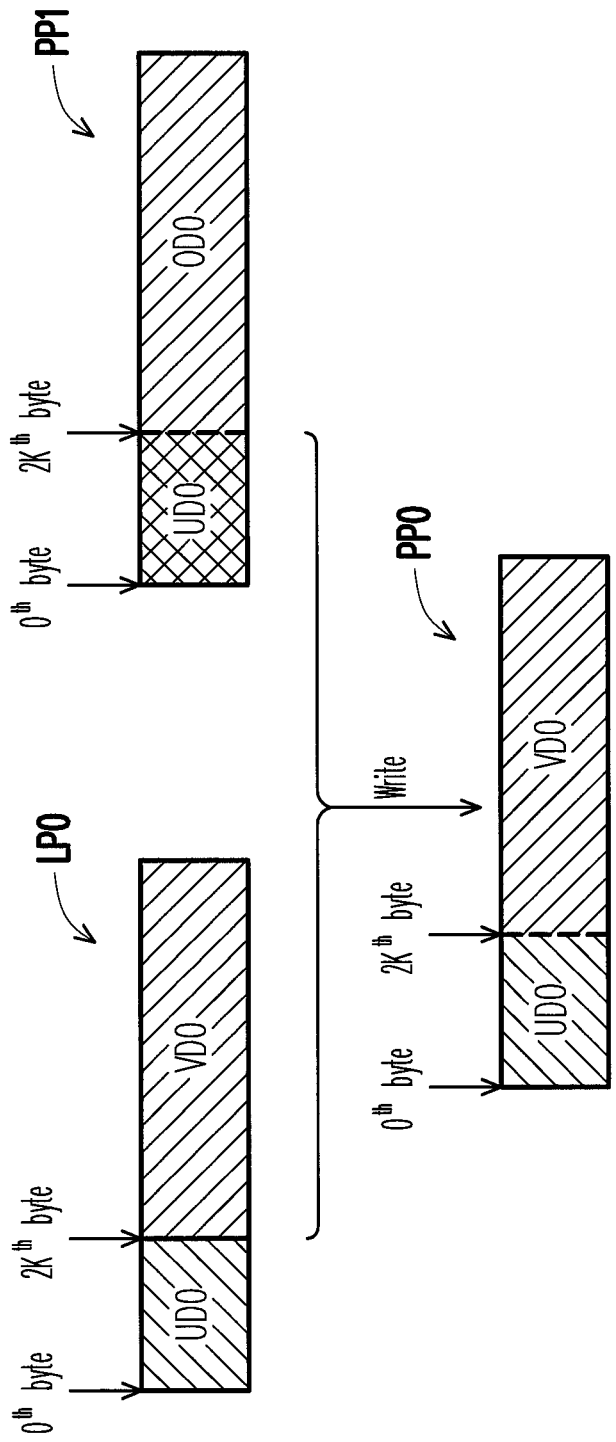
FIG. 9 illustrates an example of writing updated data having the size that is smaller than a data access unit into a physical page according to an exemplary embodiment of the present invention.

FIG. 9 illustrates an example of writing updated data having the size that is smaller than a data access unit into a physical page according to an exemplary embodiment of the present invention.

Referring to FIG. 9, if the host system 1000 is about to store 2 KB of updated data UD0 by starting from the $0^{th}$ byte of a logical page LP0 of a logical block to replace old data OD0, it is assumed that the memory management unit 308 selects a physical page PP0 of a physical block for writing the updated data.

Because the data processing unit 316 identifies that the size of the updated data UD0 is smaller than a data access unit (i.e., the updated data UD0 is only a part of the data of the logical page LP0), the memory reading unit 312 reads valid data VD0 belonging to other offset bytes of the logical page LP0 from a physical page (for example, a physical page PP1) originally mapped to the logical page LP0. After that, the data processing unit 316 arranges the updated data UD0 and the valid data VD0 into valid page data, and the memory writing unit 310 writes the valid page data into the physical page PP0.

Besides writing an updated data by using a child physical block, in the present exemplary embodiment, the memory management unit 308 further selects at least one physical block from the spare area 504 as a random physical block to write the updated data. For example, if the data in the logical page to be updated by the host system 1000 is already written into a child physical block, the updated data is written into a random physical block so that the data merging procedure won't be executed repeatedly.

Figure 10:
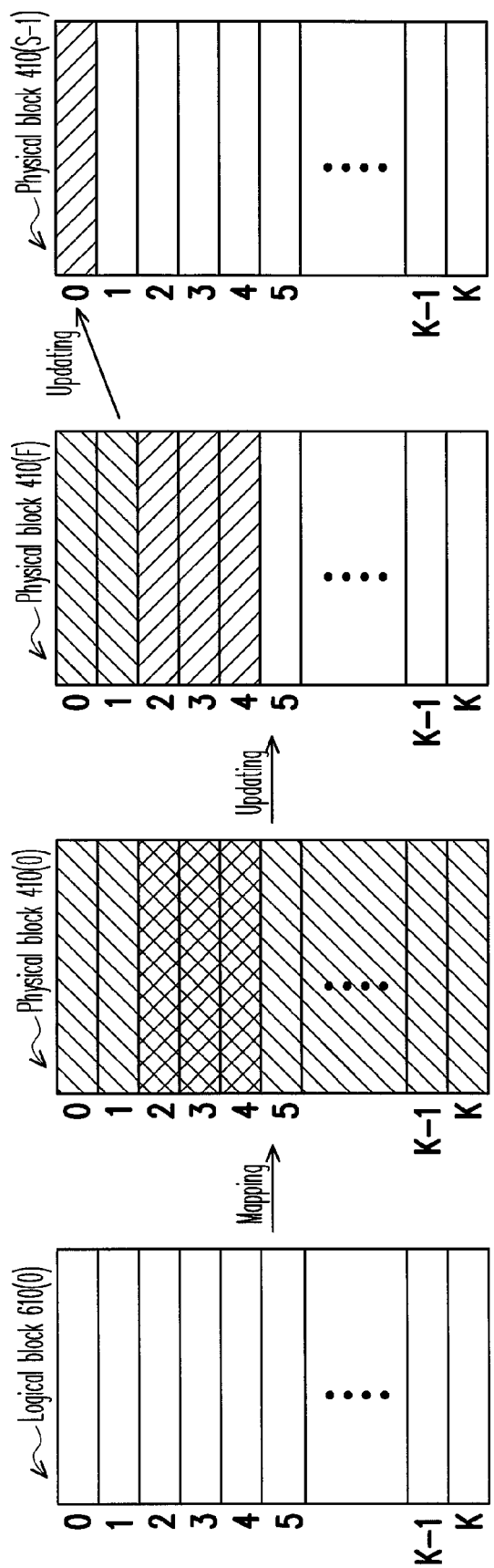
FIG. 10 is a diagram of writing a data by using a child physical block and a global random physical block according to an exemplary embodiment of the present invention.

FIG. 10 is a diagram of writing a data by using a random physical block according to an exemplary embodiment of the present invention.

Referring to FIG. 10, assuming that a physical block 410 (S−1) is selected as a random physical block, when the host system 1000 is about to write updated data into the $1^{st}$ logical page of the logical block 610(0) in the storage state illustrated in FIG. 7, the memory management unit 308 writes the updated data into the first blank physical page of the random physical block (for example, the $0^{th}$ physical page of the physical block 410(S−1)).

In the present exemplary embodiment, when a current random physical block is full, the memory management unit 308 selects another physical block from the spare area 504 as a new random physical block until the number of physical blocks served as random physical blocks reaches a predetermined value. To be specific, because there are a limited number of physical blocks in the spare area 504, the number of physical blocks that can be served as random physical blocks is also limited. When the number of physical blocks served as random physical blocks reaches the predetermined value, the memory management unit 308 executes aforementioned data merging procedure to erase those random physical blocks containing only invalid data and associate the erased physical blocks with the spare area 504. Thus, when a next write command is executed, the memory management unit 308 may select a blank physical block as a random physical block from the spare area 504 again.

It should be mentioned that during the operation of writing data into a random physical block, the data is written into a physical page in different mode according to the size of the data.

To be specific, when the host system 1000 is about to store a data (referred to as an updated data thereinafter) to a logical page and the memory management unit 308 determines to write the updated data into a random physical block, the data processing unit 316 determines whether the size of the updated data is smaller than the data access unit. If the size of the updated data is not smaller than the data access unit (i.e., is the data access unit), the memory writing unit 310 writes the updated data into a physical page of the random physical block without arranging any valid page data. For example, the writing operation illustrated in FIGS. 6-7 is to directly write updated data of an entire logical page into a physical page.

If the size of the updated data is smaller than the data access unit (i.e., is not the data access unit), the memory management unit 308 selects a physical page of the random physical block and partitions the physical page into a plurality of storage segments. Besides, the data processing unit 316 determines whether a logical offset address corresponding to the updated data (i.e., the starting logical offset address to which the host system 1000 is about to store the updated data) is corresponding to the starting physical offset address of one of storage segments in the physical page and whether the size of the updated data is equal to the segment capacity of the storage segment.

If the logical offset address corresponding to the updated data is not corresponding to the starting physical offset address of any one of specific storage segment in the physical page or the size of the updated data is not equal to the segment capacity of the storage segment, the memory writing unit 310 reads valid data belonging to other logical offset addresses of the logical page from other physical pages (for example, the physical pages of a mother physical block), arranges the updated data and the valid data to generate a complete valid page data, and writes the valid page data into the physical page (as shown in FIG. 9).

If the logical offset address corresponding to the updated data is corresponding to the starting physical offset address of one of storage segments in the physical page and the size of the updated data is equal to the segment capacity of this storage segment, the memory writing unit 310 only writes the updated data into this storage segment of the physical page without arranging the valid page data.

Figures 11, 12:
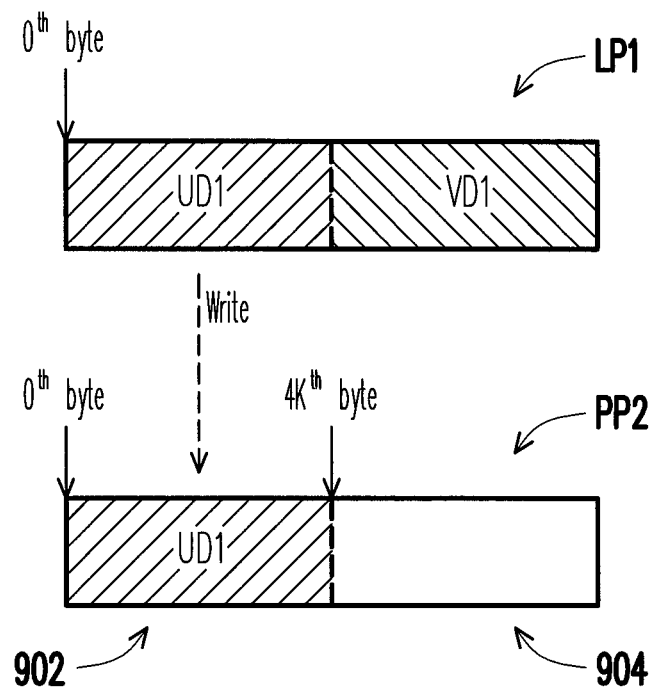
FIG. 11 illustrates another example of writing an updated data having a size smaller than a data access unit into a physical page according to an exemplary embodiment of the present invention.
FIG. 12 illustrates an example of recording state marks into a block management table according to an exemplary embodiment of the present invention.

FIG. 11 illustrates another example of writing an updated data having a size that is smaller than a data access unit into a physical page according to an exemplary embodiment of the invention.

Referring to FIG. 11, if the host system 1000 is about to store 4 KB of updated data UD1 by starting from the $0^{th}$ byte of a logical page LP1 of a logical block, the memory management unit 308 selects a physical page PP2 of a physical block for writing the updated data.

Because the data processing unit 316 identifies that the size of the updated data UD1 is smaller than the data access unit, the memory management unit 308 sequentially partitions the storage space of the physical page PP2 into a first storage segment 902 (the starting physical offset address thereof is the $0^{th}$ byte) and a second storage segment 904 (the starting physical offset address is the $4K^{th}$ byte). In the present exemplary embodiment, the page capacity of a physical page is 8 KB, and the segment capacity of a storage segment is 4 KB. Thus, one physical page can be partitioned into two storage segments. However, the present invention is not limited thereto, and the number of storage segments in each physical page varies with the segment capacity of each storage segment and the page capacity of each physical page. For example, if the page capacity is 16 KB and the segment capacity is 4 KB, the memory management unit 308 partitions a physical page into four storage segments or if the page capacity is 16 KB and the segment capacity is 8 KB, the memory management unit 308 partitions a physical page into two storage segments. Moreover, even though in the present exemplary embodiment, a physical page is partitioned into multiple storage segments having the same segment capacity, the present invention is not limited thereto, and the storage segments may also have different segment capacitys.

Additionally, because the data processing unit 316 identifies that the logical offset address corresponding to the updated data UD1 is corresponding to the starting physical offset address of the first storage segment 902 (i.e., the $0^{th}$ byte) and the size of the updated data UD1 is equal to the segment capacity of the first storage segment 902 (i.e., 4 KB), the memory writing unit 310 only writes the updated data UD1 into the first storage segment 902 but does not write the valid data VD1 belonging to other logical offset addresses of the logical page LP1 into the physical page PP2.

Namely, in the example illustrated in FIG. 11, the memory controller 104 needs not arrange any valid page data but directly writes the updated data into the physical page. Thus, the efficiency of writing data into a random physical block may be effectively improved. It should be mentioned that because as described above, data is programmed in units of each physical page in the rewritable non-volatile memory module 106, in the example illustrated in FIG. 11, after being transmitted into the rewritable non-volatile memory module 106, the updated data UD1 is still written into the physical page together with meaningless data temporarily stored in a buffer memory (not shown) of the rewritable non-volatile memory module 106.

It should be mentioned that the memory management unit 308 respectively configures a first state mark 902a and a second state mark 904a for the first storage segment 902 and the second storage segment 904, wherein the first state mark 902a and the second state mark 904a are initially recorded to indicate an invalid state. In particular, when the updated data UD1 is written into the first storage segment 902, the memory writing unit 310 records the first state mark 902a to indicate a valid state. Thus, when the host system 1000 is about to read data from the logical page, the memory management unit 308 may identify the valid data stored in the physical page based on the state mark.

The memory management unit 308 may store the state mark corresponding to a storage segment into the redundant bit area of the physical page and use one bit for indicating the state of the storage segment, wherein when valid data is stored in the storage segment, the state mark corresponding to the storage segment is recorded as "1", and when no valid data is stored in the storage segment, the state mark corresponding to the storage segment is recorded as "0". In addition, the memory management unit 308 may record the state mark corresponding to each storage segment in a physical page (for example, the physical page PP2) having only a part of its addresses storing valid data (as shown in FIG. 12) in a block management table 1102 which records physical blocks served as random physical blocks.

Besides, the microcontroller unit 302, the host interface 304, the memory interface 306, the memory management unit 308, the memory writing unit 310, the memory reading unit 312, the memory erasing unit 314, and the data processing unit 316, the memory controller 104 may further include a buffer memory, a power management circuit, and an ECC circuit.

The buffer memory is coupled to the microcontroller unit 302 and configured to temporarily store data and commands from the host system 1000 or data from the rewritable non-volatile memory module 106.

The power management circuit is coupled to the microcontroller unit 302 and configured to control the power supply of the memory storage apparatus 100.

The ECC circuit is coupled to the microcontroller unit 302 and configured to execute an ECC procedure to ensure data accuracy. To be specific, when the host interface 304 receives a write command from the host system 1000, the ECC circuit generates a corresponding ECC code for the data corresponding to the write command, and the memory writing unit 310 writes the data and the corresponding ECC code into the rewritable non-volatile memory module 106. Subsequently, when the memory reading unit 312 reads the data from the rewritable non-volatile memory module 106, it also reads the ECC code corresponding to the data, and the ECC circuit executes the ECC procedure on the data according to the corresponding ECC code.

It should be mentioned that in the present exemplary embodiment, the memory management unit 308, the memory writing unit 310, the memory reading unit 312, the memory erasing unit 314, and the data processing unit 316 are implemented as hardware structures. However, the present invention is not limited thereto. In another exemplary embodiment of the present invention, the memory management unit 308, the memory writing unit 310, the memory reading unit 312, the memory erasing unit 314, and the data processing unit 316 may also be implemented in a firmware form. For example, control instructions of the memory management unit 308, the memory writing unit 310, the memory reading unit 312, the memory erasing unit 314, and the data processing unit 316 are burnt into a read-only memory (ROM) in the memory controller, and when the memory storage apparatus 100 is in operation, these control instructions are executed by a microcontroller.

In another exemplary embodiment of the present invention, control instructions for implementing the memory management unit 308, the memory writing unit 310, the memory reading unit 312, the memory erasing unit 314, and the data processing unit 316 may also be stored in a specific area of the rewritable non-volatile memory module (for example, a system area exclusively used for storing system data in the rewritable non-volatile memory module) as program codes. For example, a ROM (not shown) and a RAM (not shown) are disposed in the memory controller, and the ROM has a boot code. When the memory controller is enabled, the microcontroller first executes the boot code to load the control instructions from the rewritable non-volatile memory module into the RAM and then runs these control instructions.

Figure 13:
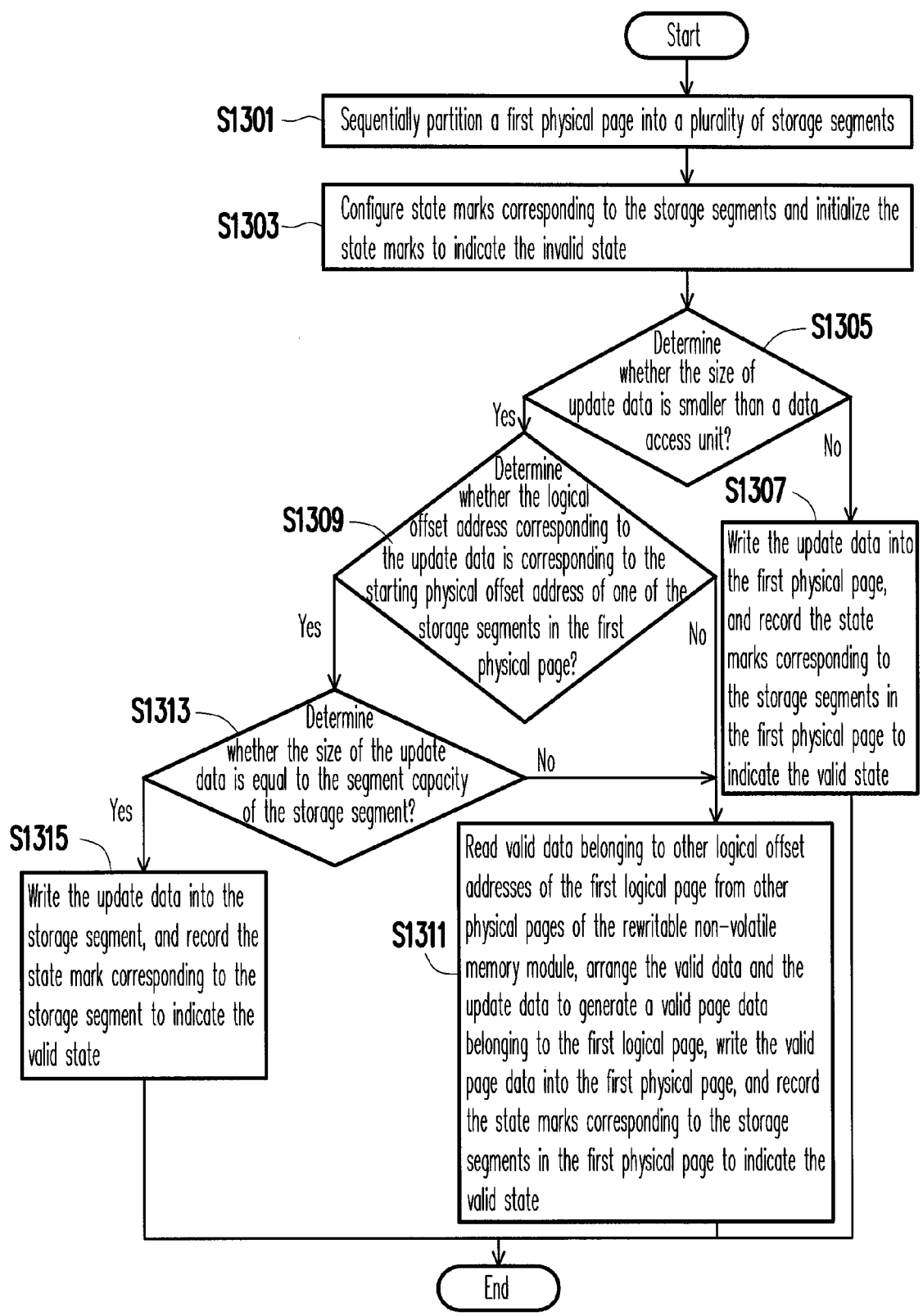
FIG. 13 is a flowchart of a data writing method according to an exemplary embodiment of the present invention.

FIG. 13 is a flowchart of a data writing method according to an exemplary embodiment of the invention, in which the steps of writing a data into a physical page of a random physical block are illustrated.

Referring to FIG. 13, when updated data belonging to a logical page (referred to as a first logical page thereinafter) is to be written into a physical page (referred to as a first physical page thereinafter) of a random physical block, first, in step S1301, the first physical page is sequentially partitioned into a plurality of storage segments, and in step S1303, state marks corresponding to these storage segments are configured and initialized to indicate an invalid state. The method for partitioning a physical page into a plurality of storage segments and configuring the state marks has been described above in detail with reference to FIG. 10 therefore will not be described herein.

Next, in step S1305, whether the size of the updated data is smaller than the data access unit is determined.

If the size of the updated data is not smaller than the data access unit, in step S1307, the updated data is written into the first physical page, and the state marks corresponding to the storage segments in the first physical page are recorded to indicate a valid state.

If the size of the updated data is smaller than a data access unit, in step S1309, whether the logical offset address corresponding to the updated data (i.e., the starting logical offset address for storing the updated data) is corresponding to the starting physical offset address of one of the storage segments in the first physical page is determined.

If the logical offset address corresponding to the updated data is not corresponding to the starting physical offset address of any storage segment in the first physical page, in step S1311, valid data belonging to other logical offset addresses of the first logical page is read from other physical pages of the rewritable non-volatile memory module 106, the valid data and the updated data are arranged to generate valid page data belonging to the first logical page, the valid page data is written into the first physical page, and the state marks corresponding to the storage segments in the first physical page are recorded to indicate the valid state.

If the logical offset address corresponding to the updated data is corresponding to the starting physical offset address of a storage segment (referred to as a target storage segment thereinafter) in the first physical page, in step S1313, whether the size of the updated data is equal to the segment capacity of the target storage segment is determined.

If the size of the updated data is not equal to the segment capacity of the target storage segment, step S1311 is executed.

If the size of the updated data is equal to the segment capacity of the target storage segment, in step S1315, the updated data is written into the target storage segment, and the state mark corresponding to the target storage segment is recorded to indicate the valid state. Particularly, in step S1315, no valid data is written into the other storage segments of the first physical page.

Even though the data writing method provided by the present invention is described in the present exemplary embodiment by assuming that an updated data is written into a storage segment in a physical page of a random physical block, the present invention is not limited thereto, and the data writing method in the present invention may be applied to an operation of writing data into any physical page of a rewritable non-volatile memory module.

As described above, the data writing method, the memory controller, and the memory storage apparatus of the exemplary embodiments may directly write updated data into a physical page without arranging any valid page data, so that the data writing efficiency can be improved. In particular, as to an operating system which always accesses data in a size (for example, 4 KB) smaller than that of a physical page (for example, 8 KB), the data writing method, the memory controller, and the memory storage apparatus provided by exemplary embodiments of the present invention can greatly improve the data access performance. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data writing method for writing an updated data into a rewritable non-volatile memory module, wherein the rewritable non-volatile memory module has a plurality of physical pages, the physical pages are alternatively mapped to a plurality of logical pages, and the updated data belongs to a first logical page among the logical pages and is sequentially stored into the first logical page by starting from a logical offset address of the first logical page, the data writing method comprising:

partitioning a first physical page among the physical pages into a plurality of storage segments, wherein each of the storage segments has a starting physical offset address;

configuring a state mark for each of the storage segments, wherein the state marks are initially recorded to indicate an invalid state;

determining whether a size of the updated data is smaller than a data access unit, wherein the data access unit is equal to a page capacity of each of the physical pages;

when the size of the updated data is smaller than the data access unit, determining whether the logical offset address is corresponding to the starting physical offset address of one of the storage segments and whether the size of the updated data is equal to a segment capacity of the one of the storage segments; and when the logical offset address is corresponding to the starting physical offset address of the one of the storage segments and the size of the updated data is equal to the segment capacity of the one of the storage segments, writing the updated data into the storage segment and recording the state mark corresponding to the one of the storage segments to indicate a valid state, wherein when the updated data is written into the one of the storage segments, valid data belonging to other logical offset addresses of the first logical page is not written into the other storage segments among the storage segments.

2. The data writing method according to claim 1 further comprising:

when the size of the updated data is not smaller than the data access unit, writing the updated data into the first physical page and recording the state marks corresponding to the storage segments to indicate the valid state.

3. The data writing method according to claim 1 further comprising:

when the logical offset address is not corresponding to the starting physical offset address of any one of the storage segments or the size of the updated data is not equal to the segment capacity of the one of the storage segments, reading valid data belonging to the first logical page from other physical pages of the rewritable non-volatile memory module, arranging the updated data and the valid data to generate valid page data according to the logical offset address corresponding to the updated data and the other logical offset addresses corresponding to the valid data, writing the valid page data into the first physical page, and recording the state marks corresponding to the storage segments to indicate the valid state.

4. A data writing method for writing updated data stored in a logical page into a physical page of a rewritable non-volatile memory module, wherein the updated data is stored into the logical page by starting from a logical offset address of the logical page, the data writing method comprising:

partitioning the physical page into a first storage segment and a second storage segment, wherein the first storage segment has a first starting physical offset address, the second storage segment has a second starting physical offset address, and the first storage segment and the second storage segment have the same segment capacity;

respectively configuring a first state mark and a second state mark for the first storage segment and the second storage segment, wherein the first state mark and the second state mark are initially recorded to indicate an invalid state;

determining whether a size of the updated data is smaller than a data access unit, wherein the data access unit is equal to a page capacity of the physical page;

when the size of the updated data is smaller than the data access unit, determining whether the logical offset address is corresponding to the first starting physical offset address or the second starting physical offset address;

when the logical offset address is corresponding to the first starting physical offset address, determining whether the size of the updated data is equal to the segment capacity, and when the size of the updated data is equal to the segment capacity, writing the updated data into the first storage segment and recording the first state mark to indicate a valid state, wherein when the updated data is written into the first storage segment, valid data belonging to other logical offset addresses of the logical page is not written into the second storage segment.

5. The data writing method according to claim 4 further comprising:

when the logical offset address is corresponding to the second starting physical offset address, determining whether the size of the updated data is equal to the segment capacity, and when the size of the updated data is equal to the segment capacity, writing the updated data into the second storage segment and recording the second state mark to indicate the valid state, wherein when the updated data is written into the second storage segment, the valid data belonging to the other logical offset addresses of the logical page is not written into the first storage segment.

6. The data writing method according to claim 4 further comprising:

when the size of the updated data is not smaller than the data access unit, writing the updated data into the physical page and recording the first state mark and the second state mark to indicate the valid state.

7. The data writing method according to claim 4 further comprising:

when the logical offset address is not corresponding to the first starting physical offset address or the second starting physical offset address, reading valid data belonging to other logical offset addresses of the logical page from other physical pages of the rewritable non-volatile memory module, arranging the updated data and the valid data to generate valid page data according to the logical offset address corresponding to the updated data and the other logical offset addresses corresponding to the valid data, writing the valid page data into the physical page, and recording the first state mark and the second state mark to indicate the valid state.

8. The data writing method according to claim 4 further comprising:

when the size of the updated data is not equal to the segment capacity, reading valid data belonging to other logical offset addresses of the logical page from other physical pages of the rewritable non-volatile memory module, arranging the updated data and the valid data to generate valid page data according to the logical offset address corresponding to the updated data and the other logical offset addresses corresponding to the valid data, writing the valid page data into the physical page, and recording the first state mark and the second state mark to indicate the valid state.

9. The data writing method according to claim 4, wherein a capacity of the physical page is 8 kilobytes (KB), wherein the step of sequentially partitioning the physical page into the first storage segment and the second storage segment comprises:
defining a storage space of 4 KB at a beginning of the physical page as the first storage segment, and defining a storage space of 4 KB at an end of the physical page as the second storage segment.

10. A memory controller for controlling a rewritable non-volatile memory module, the memory controller comprising:
a host interface, configured to couple to a host system;
a memory interface, configured to couple to the rewritable non-volatile memory module, wherein the rewritable non-volatile memory module has a plurality of physical pages;
a microcontroller, coupled to the host interface and the memory interface;
a memory management unit, coupled to the microcontroller, and configured for configuring a plurality of logical pages and alternatively mapping the physical pages to the logical pages;
a data processing unit, coupled to the microcontroller;
a memory writing unit, coupled to the microcontroller,
wherein the host interface receives updated data from the host system, wherein the updated data belongs to a first logical page among the logical pages and is sequentially stored into the first logical page by starting from a logical offset address of the first logical page,
wherein the memory management unit partitions a first physical page among the physical pages into a plurality of storage segments and configures a state mark for each of the storage segments, wherein each of the storage segments has a starting physical offset address, and the state marks are initially recorded to indicate an invalid state,
wherein the data processing unit determines whether a size of the updated data is smaller than a data access unit, wherein the data access unit is equal to a page capacity of each of the physical pages,
wherein when the size of the updated data is smaller than the data access unit, the data processing unit further determines whether the logical offset address is corresponding to the starting physical offset address of one of the storage segments and whether the size of the updated data is equal to a segment capacity of the one of the storage segments,
wherein when the logical offset address is corresponding to the starting physical offset address of the one of the storage segments and the size of the updated data is equal to the segment capacity of the one of the storage segments, the memory writing unit writes the updated data into the storage segment and records the state mark corresponding to the storage segment to indicate a valid state, wherein when the updated data is written into the storage segment, valid data belonging to other logical offset addresses of the first logical page is not written into the other storage segments among the storage segments.

11. The memory controller according to claim 10, wherein when the size of the updated data is not smaller than the data access unit, the memory writing unit writes the updated data into the first physical page and records the state marks corresponding to the storage segments to indicate the valid state.

12. The memory controller according to claim 10 further comprising a memory reading unit,
wherein when the logical offset address is not corresponding to the starting physical offset address of any one of the storage segments or the size of the updated data is not equal to the segment capacity of the one of the storage segments, the memory reading unit reads valid data belonging to other logical offset addresses of the first logical page from other physical pages of the rewritable non-volatile memory module, the data processing unit arranges the updated data and the valid data to generate valid page data according to the logical offset address corresponding to the updated data and the other logical offset addresses corresponding to the valid data, and the memory writing unit writes the valid page data into the first physical page and records the state marks corresponding to the storage segments to indicate the valid state.

13. A memory storage apparatus, comprising:
a connector, configured to couple to a host system;
a rewritable non-volatile memory module, having a plurality of physical pages; and
a memory controller, coupled to the rewritable non-volatile memory module and the connector,
wherein the memory controller configures a plurality of logical pages and alternatively maps the physical pages to the logical pages,
wherein the connector receives updated data from the host system, wherein the updated data belongs to a first logical page among the logical pages and is sequentially stored into the first logical page by starting from a logical offset address of the first logical page,
wherein the memory controller partitions a first physical page among the physical pages into a plurality of storage segments and configures a state mark for each of the storage segments, wherein each of the storage segments has a starting physical offset address, and the state marks are initially recorded to indicate an invalid state,
wherein the memory controller determines whether a size of the updated data is smaller than a data access unit, wherein the data access unit is equal to a page capacity of each of the physical pages,
wherein when the size of the updated data is smaller than the data access unit, the memory controller further determines whether the logical offset address is corresponding to the starting physical offset address of one of the storage segments and whether the size of the updated data is equal to a segment capacity of the one of the storage segments,
wherein when the logical offset address is corresponding to the starting physical offset address of the one of the storage segments and the size of the updated data is equal to the segment capacity of the one of the storage segments, the memory controller writes the updated data into the storage segment and records the state mark corresponding to the storage segment to indicate a valid state, wherein when the updated data is written into the storage segment, valid data belonging to other logical offset addresses of the first logical page is not written into the other storage segments among the storage segments.

14. The memory storage apparatus according to claim 13, wherein when the size of the updated data is not smaller than the data access unit, the memory controller writes the updated data into the first physical page and records the state marks corresponding to the storage segments to indicate the valid state.

15. The memory storage apparatus according to claim 13, wherein when the logical offset address is not corresponding to the starting physical offset address of any one of the storage segments or the size of the updated data is not equal to the segment capacity of the one of the storage segments, the memory controller reads valid data belonging to other logical offset addresses of the first logical page from other physical pages of the rewritable non-volatile memory module, arranges the updated data and the valid data to generate valid page data according to the logical offset address corresponding to the updated data and the other logical offset addresses corresponding to the valid data, writes the valid page data into the first physical page, and records the state marks corresponding to the storage segments to indicate the valid state.

16. The memory storage apparatus according to claim 13, wherein a capacity of each of the physical pages is 8 KB, and a capacity of each of the storage segments is 4 KB.

17. A data writing method for writing an updated data into a flash memory module, wherein the flash memory module has a plurality of physical pages, the physical pages are alternatively mapped to a plurality of logical pages, the updated data belongs to a first logical page among the logical pages, and each of the physical pages is a smallest writing unit of the flash memory module, the data writing method comprising:
- partitioning a first physical page among the physical pages into a plurality of storage segments;
- configuring state marks respectively for the storage segments to indicate validity of data stored in the storage segments;
- writing the updated data into at least one of the storage segments; and
- changing the state mark corresponding to the at least one of the storage segments containing the updated data, wherein the state mark corresponding to the at least one of the storage segments containing the updated data in the first physical page indicates a valid state, and the state marks corresponding to the other storage segments not containing the updated data indicate an invalid state.

* * * * *